US011040608B2

United States Patent
Lange et al.

(10) Patent No.: US 11,040,608 B2
(45) Date of Patent: Jun. 22, 2021

(54) MOTOR VEHICLE HAVING A REAR REINFORCEMENT ON AN ENERGY STORE HOUSING FRAME

(71) Applicant: Bayerische Motoren Werke Aktiengesellschaft, Munich (DE)

(72) Inventors: Georg Lange, Zwickau (DE); Siegfried Massun, Wolnzach (DE); Florian Tesch, Vaterstetten (DE); Benjamin Werner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 164 days.

(21) Appl. No.: 16/239,763

(22) Filed: Jan. 4, 2019

(65) Prior Publication Data
US 2019/0135100 A1     May 9, 2019

Related U.S. Application Data

(63) Continuation of application No. PCT/EP2017/065839, filed on Jun. 27, 2017.

(30) Foreign Application Priority Data

Jul. 6, 2016   (DE) ..................... 10 2016 212 297.5

(51) Int. Cl.
*B60R 16/04*    (2006.01)
*B60K 1/04*     (2019.01)
*B62D 25/20*    (2006.01)

(52) U.S. Cl.
CPC ............ *B60K 1/04* (2013.01); *B62D 25/2027* (2013.01); *B60K 2001/0438* (2013.01);
(Continued)

(58) Field of Classification Search
CPC .... B60K 1/04; B60K 1/00; B60K 2001/0438; B60K 2001/0405; B60K 2001/0416; B62D 25/2027; B62D 25/20; B62D 25/00
See application file for complete search history.

(56) References Cited

U.S. PATENT DOCUMENTS 5,704,644 A * 1/1998 Jaggi ........................ B60K 1/04
                                                                280/796
6,206,460 B1 * 3/2001 Seeliger ................. B62D 21/00
                                                                188/267
(Continued)

FOREIGN PATENT DOCUMENTS

CN          105438275 A        3/2016
DE          100 23 110 A1      11/2001
(Continued)

OTHER PUBLICATIONS

International Search Report (PCT/ISA/210) issued in PCT Application No. PCT/EP2017/065839 dated Sep. 12, 2017 with English translation (seven (7) pages).

(Continued)

*Primary Examiner* — James M Dolak
(74) *Attorney, Agent, or Firm* — Crowell & Moring LLP

(57) ABSTRACT

A housing for an energy store is arranged on the floor of a vehicle body. The housing has a cover, a bottom, and a peripheral frame. Fastening components are provided on a side transverse section of the frame that is at the rear in the vehicle longitudinal direction, on which fastening components the front ends of two stiffening braces extending in the shape of a V are arranged.

8 Claims, 3 Drawing Sheets

(52) U.S. Cl.
CPC ....... *B60Y 2200/91* (2013.01); *B60Y 2200/92* (2013.01); *B60Y 2306/01* (2013.01)

(56) References Cited

U.S. PATENT DOCUMENTS

| | | | | |
|---|---|---|---|---|
| 6,834,910 B2* | 12/2004 | Wendland | ............ | B62D 21/152 296/187.01 |
| 7,090,290 B2* | 8/2006 | Neumeier | ............... | B62D 21/00 280/793 |
| 7,338,115 B2* | 3/2008 | Rocheblave | ......... | B62D 21/152 296/187.11 |
| 7,568,755 B2* | 8/2009 | Imada | ................. | B62D 21/152 296/187.11 |
| 7,891,728 B2* | 2/2011 | Westing | ................. | B62D 21/06 296/204 |
| 7,950,724 B2* | 5/2011 | Yamaguchi | .......... | B62D 21/152 296/187.11 |
| 8,074,757 B2* | 12/2011 | Wagner | ................ | B62D 21/152 180/68.5 |
| 8,585,132 B2* | 11/2013 | Klimek | ................ | B60K 15/067 296/193.07 |
| 8,820,820 B2* | 9/2014 | De Luca | ............ | B62D 25/2027 296/193.07 |
| 8,833,839 B2 | 9/2014 | Young et al. | | |
| 8,919,473 B2* | 12/2014 | Bisror | ................ | B62D 25/2036 180/68.5 |
| 9,604,672 B2* | 3/2017 | Kaneko | .................. | B62D 21/11 |
| 9,789,908 B2* | 10/2017 | Tsukada | ............... | B62D 21/155 |
| 10,005,349 B2* | 6/2018 | Baccouche | .......... | B62D 25/087 |
| 10,160,301 B2* | 12/2018 | Perlo | ....................... | B62D 21/11 |
| 10,214,091 B2* | 2/2019 | Hlubina | ............ | B62D 25/2027 |
| 10,787,070 B2* | 9/2020 | Kappich | .................. | B60K 1/04 |
| 10,800,244 B2* | 10/2020 | Sawatzki | .............. | B60K 13/04 |
| 10,826,032 B2* | 11/2020 | Kaneshige | .......... | H01M 10/658 |
| 10,870,340 B2* | 12/2020 | Acikgoez | .............. | H01M 50/24 |
| 10,899,213 B2* | 1/2021 | Baccouche | .......... | B62D 21/152 |
| 10,919,375 B2* | 2/2021 | Blanc | .................... | B60R 21/026 |
| 2003/0173799 A1 | 9/2003 | Wendland et al. | | |
| 2005/0110303 A1 | 5/2005 | Neumeier et al. | | |
| 2007/0096508 A1 | 5/2007 | Rocheblave et al. | | |
| 2009/0001767 A1 | 1/2009 | Yamaguchi et al. | | |
| 2014/0193683 A1 | 7/2014 | Mardall et al. | | |
| 2016/0083011 A1 | 3/2016 | Kawaguchi | | |
| 2016/0090124 A1 | 3/2016 | Kaneko et al. | | |
| 2016/0144897 A1 | 5/2016 | Cho et al. | | |

FOREIGN PATENT DOCUMENTS

| | | |
|---|---|---|
| DE | 102 14 372 C1 | 7/2003 |
| DE | 10 2011 015 624 A1 | 11/2011 |
| DE | 10 2012 203 892 A1 | 9/2013 |
| DE | 10 2014 004 853 A1 | 10/2015 |
| DE | 10 2015 212 854 A1 | 5/2016 |
| EP | 2 990 307 A2 | 3/2016 |
| WO | WO 2006/114525 A1 | 11/2006 |
| WO | WO 2013/047266 A1 | 4/2013 |

OTHER PUBLICATIONS

German-language Written Opinion (PCT/ISA/237) issued in PCT Application No. PCT/EP2017/065839 dated Sep. 12, 2017 (five (5) pages).

German Search Report issued in counterpart German Application No. 10 2016 212 297.5 dated May 4, 2017 with partial English translation (13 pages).

Chinese-language Office Action issued in Chinese Application No. 201780038155.6 dated Aug. 27, 2020 with English translation (13 pages).

* cited by examiner

MOTOR VEHICLE HAVING A REAR REINFORCEMENT ON AN ENERGY STORE HOUSING FRAME

CROSS REFERENCE TO RELATED APPLICATIONS

This application is a continuation of PCT International Application No. PCT/EP2017/065839, filed Jun. 27, 2017, which claims priority under 35 U.S.C. § 119 from German Patent Application No. 10 2016 212 297.5, filed Jul. 6, 2016, the entire disclosures of which are herein expressly incorporated by reference.

BACKGROUND AND SUMMARY OF THE INVENTION

The invention relates to a motor vehicle with a vehicle body which has a passenger cell, longitudinal carriers which run on a floor of the vehicle body and extend from a vehicle front section over the passenger cell as far as into a vehicle rear, and two rear reinforcing struts which run in a V-shaped manner.

US 2014/0193683 A1 discloses a high voltage battery which is fastened to an outer face of the floor of the vehicle body of a motor vehicle. The motor vehicle can be a fully electric vehicle or a hybrid vehicle which has at least one electric drive system. A housing of the high voltage battery consists of a cover, a floor and a peripheral side wall.

The housing of the high voltage battery from US 2014/0193683 A1 encloses a cavity, in which energy stores are arranged. The circumferential side walls consist, for example, of extruded profiles. In one embodiment, two lateral longitudinal walls which run in the vehicle longitudinal direction are connected to one another via crossmembers which can likewise be manufactured from extruded profiles.

U.S. Pat. No. 8,833,839 B2 discloses, for example, crossmembers of this type. In U.S. Pat. No. 8,833,839 B2, a side impact protection extruded profile adjoins the respective lateral longitudinal wall.

DE 100 23 110 A1 discloses a Y-shaped rear strut for increasing the flexural and torsional rigidity of bodies in white. Furthermore, an intermediate support of the rear strut is provided between the longitudinal carriers and the receiving block or receiving part in DE 100 23 110 A1.

DE 102 14 372 C1 discloses a motor vehicle, in which two rear reinforcing struts which run in a V-shaped manner are provided on a floor of the vehicle body. A front end of the respective reinforcing strut is fastened to a lateral longitudinal carrier below the passenger cell. An end of the respective ends of the reinforcing strut which lies opposite said front end is fastened to the floor of the vehicle rear via an attachment region.

It is an object of the invention to provide a motor vehicle with at least one electric drive system, in the case of which the reinforcement of the vehicle rear is simplified.

This and other objects are achieved by a motor vehicle with a vehicle body which has a passenger cell, longitudinal carriers which run on a floor of the vehicle body and extend from a vehicle front section over the passenger cell as far as into a vehicle rear, and two rear reinforcing struts which run in a V-shaped manner. The rear ends of the reinforcing struts are arranged on the floor of the vehicle rear via a receiving component, the two rear reinforcing struts lying approximately in a horizontal plane. A housing for an energy store is arranged on the floor of the vehicle body, wherein the housing has a cover, a floor and a peripheral frame. Fastening sections are provided on a rear lateral transverse section of the frame, on which fastening sections the front ends of the two reinforcing struts which run in a V-shaped manner are arranged.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
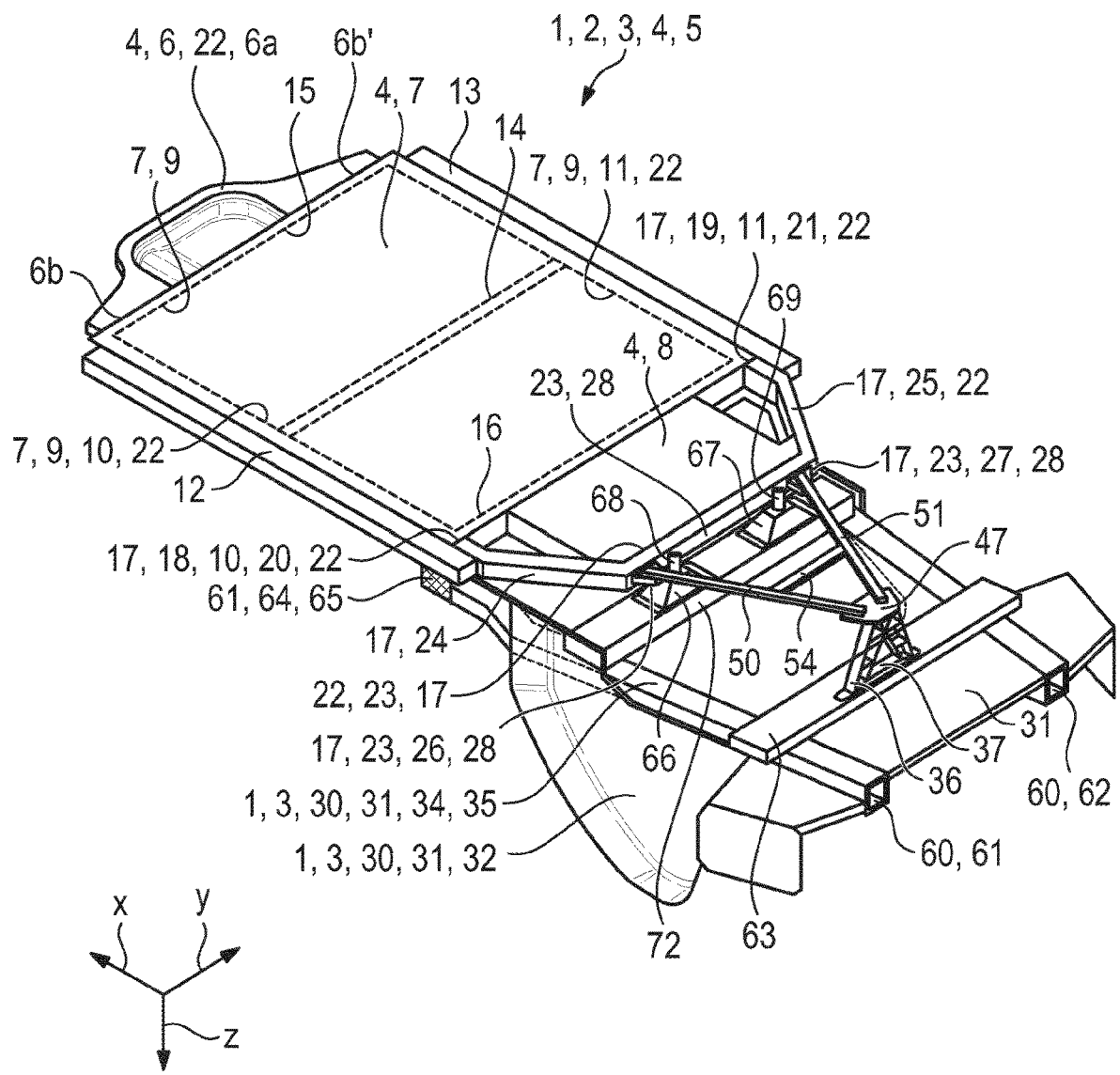
FIG. 1 is a perspective view of an underside of a floor assembly of a motor vehicle.

FIG. 1 shows a partially illustrated underside 2 of a motor vehicle 1. A housing 4 of an energy store 5 is arranged below a passenger cell (not shown) of a partially illustrated vehicle body 3. The housing 4 has a cover 56, a floor 55 and a peripheral frame 9. An energy store 5 of this type is known, for example, from US 2014/0193683 A1; reference is made to the design thereof.

In the embodiment which is shown, the housing 4 (shown in FIG. 1) of the energy store 5 has substantially three housing sections 6, 7, 8.

A front (as viewed in the vehicle longitudinal direction x) housing section 6 is configured, for example, in a metal sheet shell design. An edge section 6a of the front housing section 6 is configured as a frame which is in principle U-shaped in plan view. The edge section 6a of the front housing section 6 is arranged with its respective front-side end 6b, 6b' on a peripheral frame 9 of an adjoining central housing section 7.

An inner edge of the circumferential frame 9 of the central housing section 7 is shown using dashed lines in FIG. 1. The frame 9 is manufactured, for example, from extruded profiles. In each case one outer lateral longitudinal carrier 12, 13 which serves as a side impact protection means in the vehicle transverse direction y is arranged on the two opposite lateral longitudinal walls 10 and 11 of the frame 9.

In one embodiment, the central housing section 7 has at least one crossmember 14 which runs in the vehicle transverse direction y and is shown using dashed lines in FIG. 1. Together with the front and rear lateral transverse walls 15, 16 of the housing section 7, the existing number of crossmembers 14 in conjunction with the two outer lateral longitudinal carriers 12, 13 and the lateral longitudinal walls 10, 11 of the frame 9 prevents the central housing section 7 from being deformed in the case of a crash from the side.

The rear lateral transverse wall 16 of the housing section 7 is adjoined by the rear housing section 8. In the embodiment which is shown, the rear housing section 8 is surrounded by a U-shaped frame part 17. A respective end face 18, 19 of the frame part 17 bears against a respective end face 20, 21 of the respective lateral longitudinal wall 10, 11.

The U-shaped edge section 6a of the front housing section 6, the two opposite lateral longitudinal walls 10 and 11 of the frame 9 of the central housing section 7, and the U-shaped frame part 17 of the rear housing section 8 form a closed, peripheral, outer frame 22.

The U-shaped frame part 17 has a lateral transverse section 23 and in each case one lateral longitudinal section 24, 25 which runs obliquely with respect to it. In the embodiment which is shown, two fastening sections 26, 27 which are spaced apart from one another are arranged on the lateral transverse section 23 of the frame part 17. In the embodiment which is shown, the fastening sections 26, 27 are configured as projecting flange sections.

The flange sections 26, 27 can be configured in one piece on the lateral transverse section 23 of the frame part 17, or can be fastened as an individual component to the outer face 28 of the lateral transverse section 23.

In another embodiment, the two fastening sections 26, 27 which are spaced apart from one another are configured, for example, as indentations with attachment possibilities, such as a thread or a through opening, in the lateral transverse section 23 or in the lateral longitudinal sections 24, 25 of the frame part 17.

Figure 3:
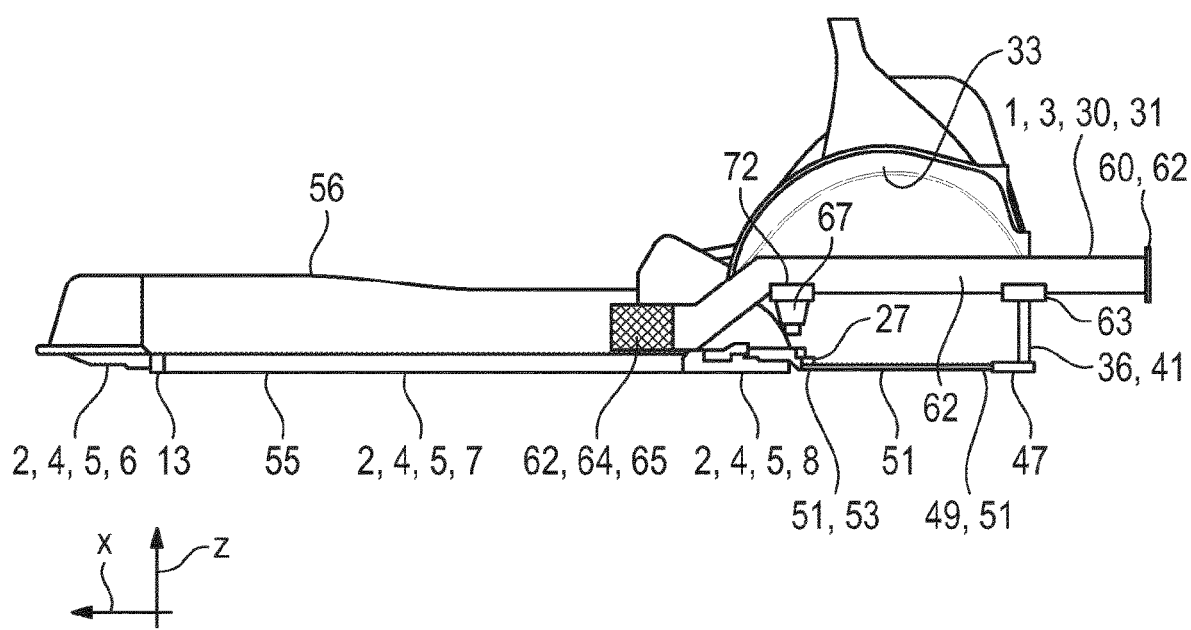
FIG. 3 is a side view of the floor assembly which is shown in FIG. 1, from which side view the horizontal arrangement of the torsion struts on the perpendicularly arranged receiving block is apparent.
Figure 4:
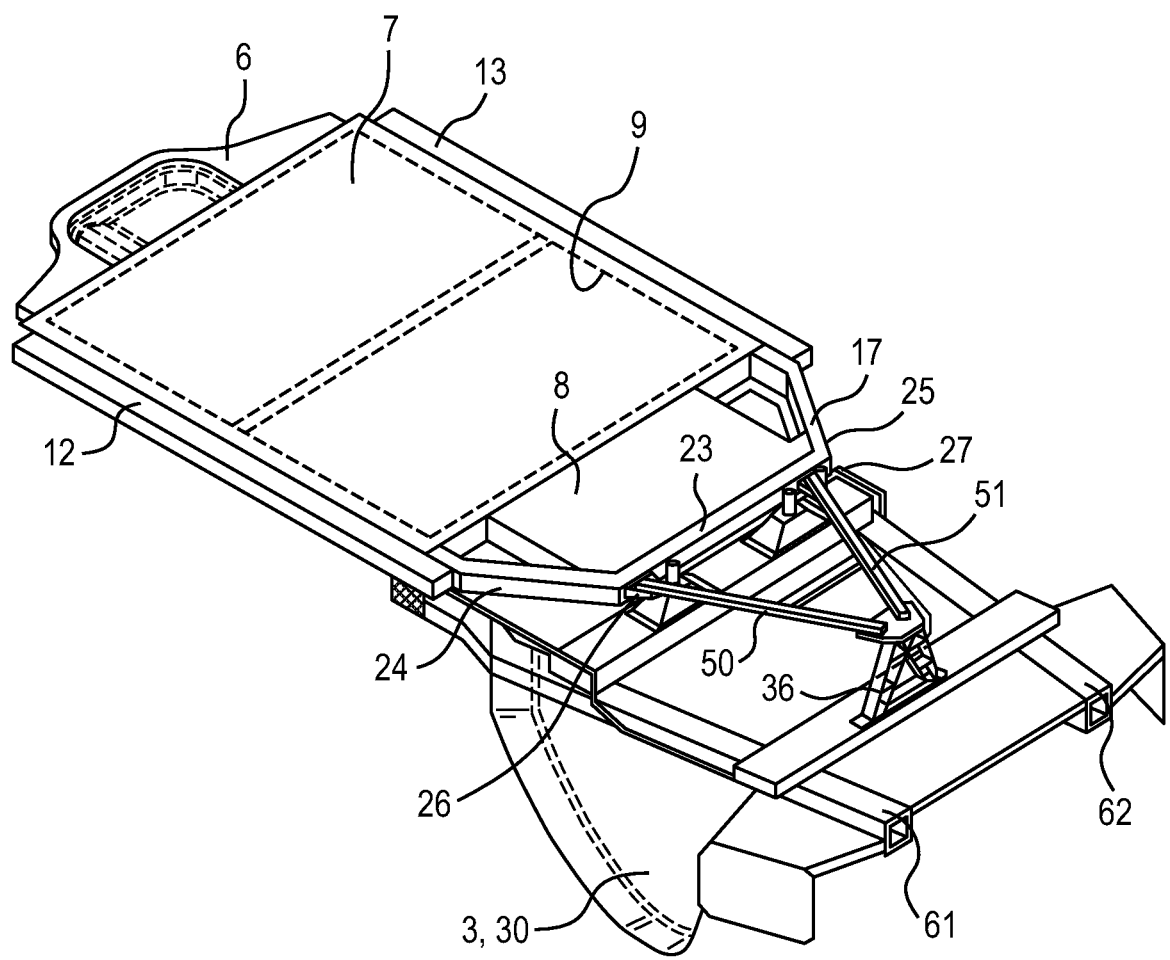
FIG. 4 is a perspective view per FIG. 1 but with limited reference numbers.

Adjoining the rear housing section 8, FIG. 1 shows a floor assembly 30 of the vehicle body 3, which shows a rear region 31 of the motor vehicle 1. Wheel arches 32 and 33 are configured on both sides on the floor assembly 30. The wheel arch 33 is shown in FIG. 3.

Rear longitudinal carriers 61 and 62 which are spaced apart from one another are configured in the rear region 31 in the direction of a trunk (not shown) or luggage compartment of the motor vehicle 1, which longitudinal carriers 61 and 62 extend in a known way from the rear-side vehicle end 60 in the vehicle longitudinal direction x forward in the direction of side sills (not shown). In the embodiment which is shown, the longitudinal carriers 61 and 62 are connected to one another by way of a rear crossmember 63 and by way of a front crossmember 72.

A receiving component 36 is fastened centrally (in relation to the vehicle transverse direction y) on an outer face 34, which faces away from the motor vehicle 1, of a floor section 35 which connects the two rear longitudinal carriers 61, 62. In one embodiment which is shown in FIGS. 1 and 3, the receiving component 36 is fastened to the crossmember 63.

Figure 2:
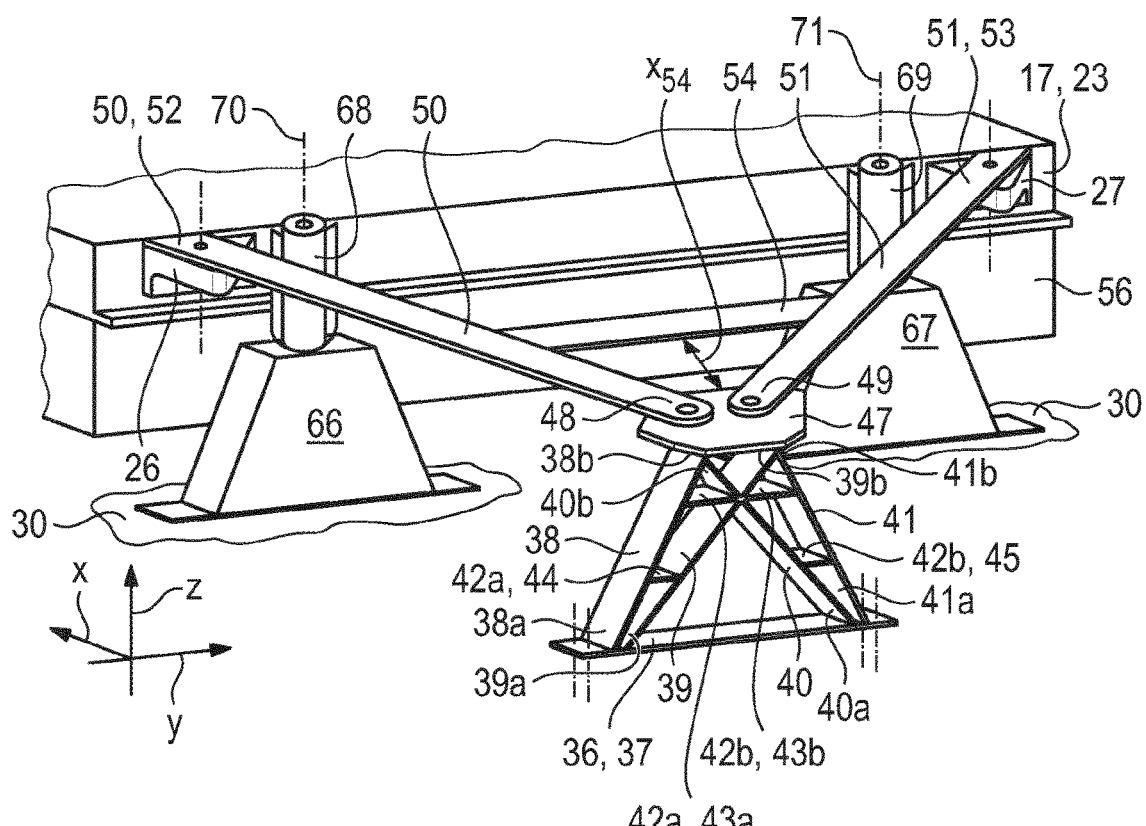
FIG. 2 is an enlarged illustration of a part region of FIG. 1, which enlarged illustration shows an attachment of two torsion struts which run in a V-shaped manner between a housing for an energy store and a receiving block which is fastened to the vehicle body floor.

As is apparent from the perspective view of FIG. 2, the receiving component 36 has a trapezoidal construction as viewed in the vehicle longitudinal direction x. In the illustrated embodiment of the receiving component 36, a floor component 37 is provided, on which struts 38, 39, 40, 41 are provided which run obliquely downward, that is to say in the vertical direction z.

In the embodiment which is shown, the struts 38, 39, 40, 41 are connected to one another in an intermediate region 42a and 42b via horizontally running reinforcements 43a, 43b, 44, 45. The lower ends 38a, 39a, 40a, 41a of the struts 38, 39, 40, 41 are fastened to the floor component 37. A fastening plate 47 is arranged at the upper ends 38b, 39b, 40b, 41b of the struts 38, 39, 40, 41.

The rear ends 48, 49 of two reinforcing struts 50, 51 which run in a V-shaped manner are fastened to the fastening plate 47. The front ends 52, 53 of the reinforcing struts 50, 51 are fastened to the respective flange section 26, 27 on the lateral transverse section 23 of the frame part 17.

The two reinforcing struts 50, 51 are connected to one another at a predefined spacing $x_{54}$ (in the vehicle longitudinal direction x) from the receiving component 36 and therefore from the flange sections 26, 27 by way of an intermediate strut 54 which runs in the vehicle transverse direction y.

FIG. 2 shows an enlarged illustration of the arrangement of the receiving component 36, the reinforcing struts 50, 51 which are fastened thereto, the intermediate strut 54 and the two flange sections 26, 27 on the lateral transverse section 23 of the frame part 17. Furthermore, it can be seen in FIG. 2 that the frame component 17 is concealed by way of a trough-shaped cover 56 in the embodiment which is shown.

Furthermore, FIGS. 1 and 2 show two fastening components 66 and 67 which are fastened to the floor assembly 30 of the vehicle body 3 of the motor vehicle 1. Two fastening elements 68, 69 are configured on the lateral transverse section 23 of the frame part 17 of the housing 4. The two fastening elements 68, 69 are fastened to the two fastening components 66 and 67, for example, via fastening means 70, 71, such as screws or the like.

The two fastening elements 68, 69 can be configured as separate components, as shown in FIGS. 1 and 3. In another embodiment, the two fastening elements 68, 69 are configured in one piece as one component with the two fastening means 26, 27.

FIG. 3 shows the housing 4 of the energy store 5 and the rear region 31, arranged thereon, of the floor assembly 30 of the vehicle body 3 of the motor vehicle 1. The wheel arch 33 can be seen in FIG. 3. As is apparent from FIG. 3, the reinforcing struts 50, 51 run horizontally. In the embodiment which is shown, the receiving component 36 is arranged perpendicularly in the z-direction. In another embodiment, the receiving component 36 is arranged in an obliquely rearwardly inclined manner.

Furthermore, FIGS. 1 and 3 show the fastening region 64 (known from DE 100 23 110 A1) and the fastening region 64 (known from DE 102 14 372 C1) of a front end of a reinforcing strut (not shown) using hatched lines (in an analogous manner with respect to the reinforcing strut 50, 51) at the height of a side sill (not shown in further detail) or (lateral) longitudinal carrier or a respective front end 65 of the longitudinal carriers 61 and 62 below the passenger cell (not shown).

In contrast to the attachment of the front ends of the reinforcing struts of DE 100 23 110 A1 and DE 102 14 372 C1 which are arranged on the two side sills or (lateral) longitudinal carriers, the reinforcing struts 50, 51 according to the invention can be of shorter configuration, approximately by the length of the lateral longitudinal sections 24, 25 of the frame part 17.

The shortening of the reinforcing struts 50, 51 according to the invention is due to the fact that the reinforcing struts 50, 51 on the lateral transverse section 23 of the frame part 17 of the housing 4 of the energy store are fastened to the two fastening sections 26, 27 which are configured as flange sections.

Furthermore, the intermediate support (known, for example, from DE 100 23 110 A1) on the vehicle floor between the longitudinal carriers and the receiving block or the receiving part 36 can be dispensed with.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
   a vehicle body having a passenger cell;
   longitudinal carriers which run on a floor of the vehicle body and extend from a vehicle front section over the passenger cell into a vehicle rear;
   two rear reinforcing struts which run in a V-shaped manner, rear ends of the two reinforcing struts being arranged on the floor of the vehicle rear via a receiving component, wherein the two rear reinforcing struts lie in a horizontal plane;
   a housing for an energy store arranged on the floor of the vehicle body, wherein the housing has a cover, a floor and a peripheral frame; and
   fastening sections provided on a rear lateral transverse section of the peripheral frame, wherein
   front ends of the two reinforcing struts which run in the V-shaped manner are respectively arranged on the fastening sections.

2. The motor vehicle as claimed in claim 1, wherein the housing has:
   (i) a central housing section, or
   (ii) a central housing section and a rear housing section, or
   (iii) a front housing section, a central housing section and a rear housing section.

3. The motor vehicle as claimed in claim 1, wherein the rear lateral transverse section of the frame is a frame part which is of U-shaped or V-shaped configuration.

4. The motor vehicle as claimed in claim 1, wherein the rear lateral transverse section of the frame is manufactured from a light metal or a steel sheet shell design.

5. The motor vehicle as claimed in claim 2, wherein the fastening sections are provided on the frame part of the rear housing section or on the central housing section if a rear housing section of the housing is absent.

6. The motor vehicle as claimed in claim 1, wherein the fastening sections are projecting flange sections.

7. The motor vehicle as claimed in claim 1, wherein the receiving component is fastened to the floor of the rear region of the vehicle body in a perpendicularly or rearwardly and upwardly inclined manner.

8. The motor vehicle as claimed in claim 1, wherein the fastening sections for the front ends of the reinforcing struts are spaced apart from lateral longitudinal carriers of the housing in the vehicle transverse direction.

* * * * *